United States Patent
Magnezi et al.

(10) Patent No.: US 10,990,514 B2
(45) Date of Patent: Apr. 27, 2021

(54) DETECTING PROBLEMATIC CODE CHANGES

(71) Applicant: Red Hat, Inc., Raleigh, NC (US)

(72) Inventors: Nir Magnezi, Petach Tikva (IL); Michel Peterson, Ramat Gan (IL); Michael Kolesnik, Netanya (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/533,438

(22) Filed: Aug. 6, 2019

(65) Prior Publication Data
US 2021/0042216 A1 Feb. 11, 2021

(51) Int. Cl.
G06F 9/44 (2018.01)
G06F 11/36 (2006.01)
G06F 8/30 (2018.01)

(52) U.S. Cl.
CPC .......... G06F 11/3688 (2013.01); G06F 8/30 (2013.01); G06F 11/368 (2013.01)

(58) Field of Classification Search
None
See application file for complete search history.

(56) References Cited

U.S. PATENT DOCUMENTS

| | | | | |
|---|---|---|---|---|
| 9,354,865 | B2* | 5/2016 | Fiebig | G06F 8/70 |
| 9,588,876 | B2 | 3/2017 | Swierc et al. | |
| 9,734,043 | B2* | 8/2017 | Crova | G06F 11/3676 |
| 10,175,978 | B2* | 1/2019 | Biddle | G06F 11/3668 |
| 10,565,511 | B1* | 2/2020 | Cui | G06N 5/027 |
| 2014/0282459 | A1* | 9/2014 | Hey | G06F 8/60 717/168 |
| 2015/0143335 | A1* | 5/2015 | Jain | G06F 8/71 717/121 |
| 2017/0199737 | A1* | 7/2017 | Bofferding | G06F 11/3692 |
| 2018/0101465 | A1* | 4/2018 | Keinan | G06F 11/3624 |

FOREIGN PATENT DOCUMENTS

WO 2019040543 A1 2/2019

OTHER PUBLICATIONS

Bhagwan, R., et al., "Orca: Differential Bug Localization in Large-Scale Services," Microsoft Research India, Oct. 8-10, 2018, https://www.usenix.org/system/files/osdi18-bhagwan.pdf.
Ziftci, C., et al., "Who Broke the Build? Automatically Identifying Changes That Induce Test Failures in Continuous Integration at Google Scale," Google Inc., 2017, https://static.googleusercontent.com/media/research.google.com/en//pubs/archive/45794.pdf.

* cited by examiner

*Primary Examiner* — Anna C Deng
(74) *Attorney, Agent, or Firm* — Kilpatrick Townsend & Stockton LLP

(57) ABSTRACT

Problematic code changes that broke a software build can be identified. For example, a system can identify a broken software build and a last stable software-build associated with a software project, and generate a history of code commits associated with the software project based on commit logs from commit repositories. The code commits in the history were applied to the software project after the last stable software-build and before the broken software build. The system can then iteratively test the code commits in the history to determine a problematic code-commit that is at least partially responsible for the broken software build.

17 Claims, 4 Drawing Sheets

300

| AGGREGATED HISTORY | | | | |
|---|---|---|---|---|
| PRIORITY | COMMIT ID | DATE | ADDRESS | STABLE |
| Alpha | A-2.0 | 2019.06.20 | XX.XX.XX | No |
| Beta | B-1.3 | 2019.06.21 | 123.45.678 | ? |
| Gamma | G-4.6 | 2019.06.22 | ZZ.ZZ.ZZ | ? |
| Omega | O-2.5 | 2019.06.22 | 978.65.234 | ? |

*FIG. 3*

DETECTING PROBLEMATIC CODE CHANGES

TECHNICAL FIELD

The present disclosure relates generally to software development testing tools. More specifically, but not by way of limitation, this disclosure relates to detecting code changes within software development environments that cause software or underlying computing devices to malfunction.

BACKGROUND

When developing a software application, developers often run a battery of tests that validate code changes on a periodic basis (e.g., weekly, nightly, etc.). Examples of these tests include system tests, integration tests, acceptance tests, and unit tests. In some cases, a software build may break due to a code change causing the software or the underlying computing device to malfunction. Because software development projects are usually gated when submitting the code changes to a code base, it is usually a dependent library change that causes the malfunction, because they usually do not cross the development gate. For example, if a library is developed as part of a number of software development projects, the software projects that are dependent on the library may obtain and install the latest version of the library during a code update. But certain changes to the library could cause parts of one or more of the software development projects to cease working or malfunction.

BRIEF DESCRIPTION OF THE DRAWINGS

FIG. 3 is a data table of an example of a list of code commits for use in identifying problematic code changes according to some aspects.

DETAILED DESCRIPTION OF THE INVENTION

Figure 1:
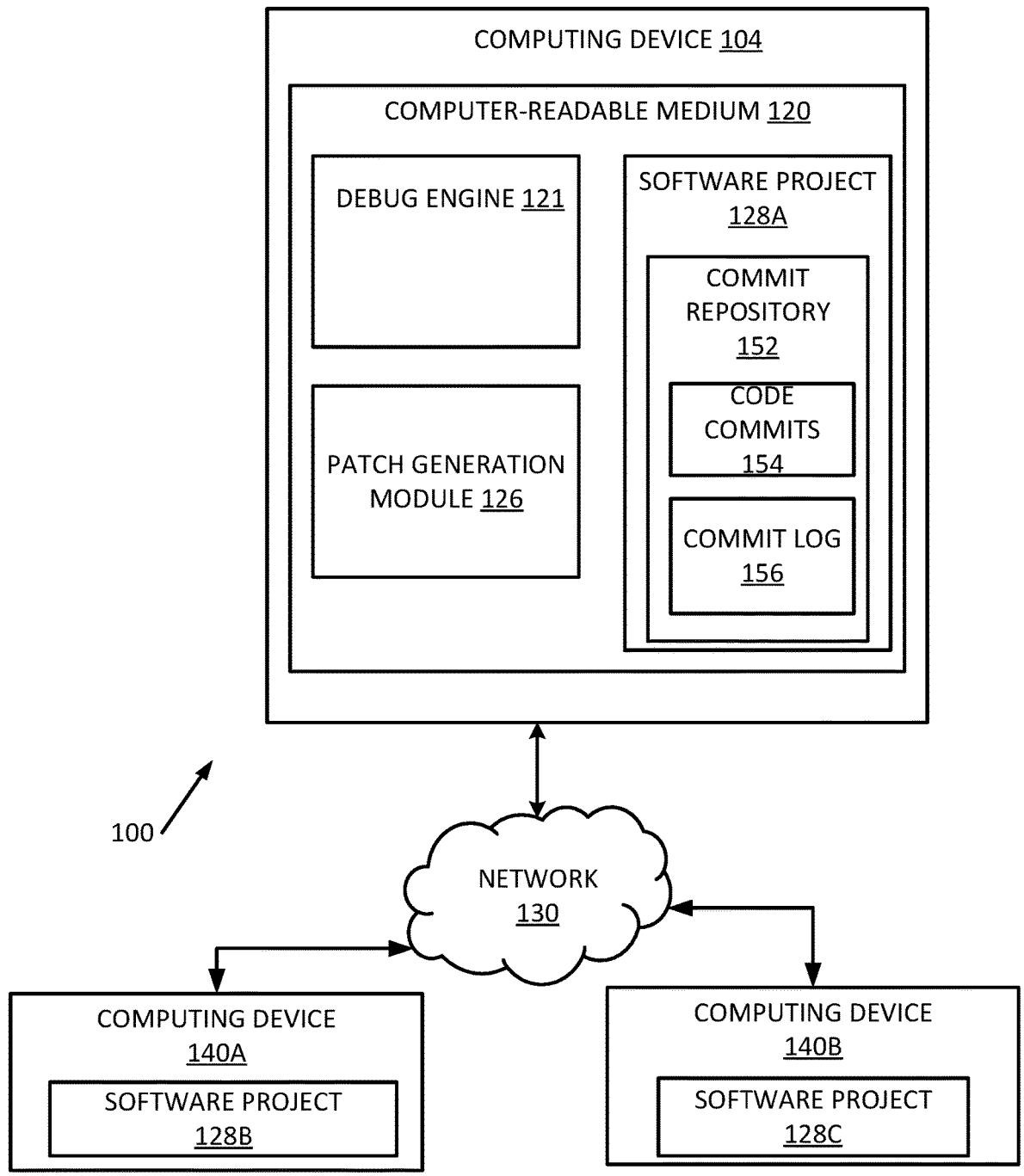
FIG. 1 is a block diagram of an example of a system for identifying problematic code changes according to some aspects.

Detection of software build failures requires time consuming, tedious, manual testing by software developers. This is because developers must test portions of software code and libraries across multiple software builds, e.g., current builds in a software development project. A single software-code change can impact the performance of multiple software builds. Thus, software developers may have to manually test portions of multiple software builds in order to identify the specific software code that caused the software builds to break. This is a time consuming, tedious process that introduces high potential for error in code tracking and patch implementation.

Certain aspects and features of the present disclosure overcome one or more of the abovementioned problems by automatically identifying code changes resulting in malfunction of one or more software builds. For example, a system of the present disclosure can automatically determine which code change caused a software build to malfunction.

Various processes can be used to identify problematic code changes and optionally generate a suggested software patch for approval by a developer and implementation in impacted software builds.

As one particular example, the system can identify a broken software build for a software project. The broken software build may be a version of the software project that does not operate as intended. The system can also identify a last stable software-build for the software project. The last stable software-build can be the most recent, known version of the software project that operates as intended. The broken software build may arise from software developers making many code changes to the last stable software-build. These code changes can be referred to as code commits. To determine which code commit resulted in the broken software build, the system can generate a list of code commits associated with the software project that were applied after the last stable software-build and before the broken software build. The system can sort the list of code commits by timestamp from newest to oldest. The system can then traverse backwards through the list from the newest code commit to the oldest code commit, testing each of the code commits within the list to determine which of the code commits resulted in the earliest broken software build (the first broken software build in time since the last stable software-build). This code commit can be referred to as a problematic code-commit. Upon identifying the problematic code-commit, the system can notify a developer so that the developer can take appropriate corrective action with respect to the problematic code-commit.

A system as described in certain aspects can detect a break in a software build. A broken software build can manifest as one or more failed bench tests, an operational malfunction, failure to start at runtime, failure to produce expected results, crash during operation, etc. Based on detecting the break in the software build, the system can retrieve the commit logs (e.g., a record of all code commits implemented in the software project over time) from each repository of the software project and its dependent projects. The system can use the commit logs to track changes to the software project occurring since the last stable software-build and identify therefrom the problematic code-commit that produced the earliest unstable software build. For example, the system can aggregate the commit logs from different repositories associated with the software project into a single aggregated history. The aggregated history can be a data structure containing some or all of the code commits occurring before the broken software build and occurring after the last stable software-build, ordered by timestamp. Each entry may contain a commit ID, a time stamp, and a reference to a commit repository associated with the commit. The system can use the aggregated history to iteratively build and test software using the code commits identified in the history. The system can use any suitable processes and techniques for traversing the list of code commits in the aggregated history to identify the problematic code-commit.

For example the system can begin with the broken software build and step backward in time, testing each prior code commit in the aggregated history by building and testing the software project using that commit. In another example, the system can begin with the last stable software-build and step forward in time, testing each subsequent code commit in the aggregated history by building and testing the software project using that commit. In yet another example, the system can identify a code commit halfway through the aggregated history and begin by building and testing the software project using that code commit. In still another example, the aggregated history may contain identifiers of the priority of a code commit. The system can begin by identifying the code commit of the highest priority, and build and test that software project using that code commit.

The results of traversing through the aggregated history can be an identification of a problematic code-commit that resulted in the earliest broken software build. The system can compare the code of the last stable software-build to the problematic code-commit(s) to identify one or more differences between the two. This difference can be used to generate a potential software code patch that a developer can apply to the software project to address the code change that resulted in the broken software build.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for identifying problematic code changes according to some aspects. The components of the system 100 are exemplary, and other examples can include more components, fewer components, different components, or a different configuration of the components shown in FIG. 1.

The system 100 includes a computing device 104 with a debug engine 121 for enabling the identification of problematic code changes in code commits 154 to one or more software projects 128A-C. The computing device 104 can be in communication with one more other computing devices 140A-B through a network 130. The network 130 may include any type of network. For example, network 130 may include a local area network, (LAN), a wide area network (WAN), the Internet, or a wireless network, etc. In some examples, the computing device 104 may include specialized testing circuitry/logic and a non-transitory computer readable medium 120.

Computing device 104 may store a development project, e.g., software project 128A, which may have dependent software projects 128B-C stored on the other computing devices 140A-B, an online repository, a website, or elsewhere via a network interface. Each software projects 128A-C can include a commit repository 152 storing software code commits 154 implemented in software builds of the software project 128A-C. These code commits 154 can be some or all of the code changes used in various software builds of the software project throughout the lifespan of the software project 128A-C. A record of these code changes is maintained in a commit log 156 in each commit repository 152. The commit log 156 can store the commit ID, time stamp of code commit implementation, and a pointer to a repository containing the software change. The commit log 156 can be used by the computing device 104 to generate an aggregated history of some or all commit logs 156 across a software project and any dependent software projects it may have 128A-C.

In some examples, the debug engine 121 can detect (e.g., determine or identify) that a software build is broken. Broken software builds are those that are malfunctioning, not operating as intended, failing to start, crashing, etc. The debug engine 121 can observe operation of a software build in a runtime environment and can use a number of classification techniques to identify malfunctions. Additionally or alternatively, the debug engine 121 can monitor for failure of a software build to launch or a crash event. The debug engine 121 can identify a software project 128A that includes the broken software build and any dependent software projects, such as software projects 128B-C. Once a broken software build is detected, the debug engine 121 can begin the process of determining which code commit broke the software build and generating a potential patch.

The debug engine 121 can access the commit repositories 152 of the software project 128A with the broken software build and the dependent software projects 128B-C associated with the broken software build. This can include accessing computer-readable medium 120 connecting with computing devices 140A-B. The debug engine 121 can access the commit logs 156 of each commit repository 152 and aggregate the information together into a list or data structure. This aggregated information can include the commit IDs of all commits made after the last stable software-build before the broken software build, the timestamp of implementation of those commits, pointers to the location in storage of each code commit, a priority associated with each code commit, or any combination of these.

In some examples, the debug engine 121 can traverse the list to identify a problematic code-commit. For example, the debug engine 121 can determine a first pointer corresponding to the broken software build. Similarly, the debug engine 121 can determine a second pointer corresponding to the last stable software-build. The first and second pointers can be timestamps or any other indicia of the software builds. The debug engine 121 can then traverse through the list, testing each code commit between the first and second pointers. As each code commit is tested, the debug engine 121 can determine if the resulting software build is stable or is also broken. If the software build is also broken, the debug engine 121 can make a note of this status in the aggregated history and proceed to the next code-commit, adjusting a current commit-pointer that tracks progress through the aggregated history list. The debug engine 121 can repeat this process until it identifies a stable code-commit yielding a stable software build. At this point, the debug engine 121 can discern that the problematic code-commit is the one immediately following (in time) the stable code-commit that produced the stable software build. In some examples, the entire list may be traversed and tested before identifying the earliest problematic code-commit in time to produce a broken software build.

In some examples, the debug engine 121 can use the current code-commit (i.e., the code commit to which the current commit-pointer is pointing) to build a version of the software project 128A using the current code-commit. In some examples, the software build is tested by attempting to run or launch the software. If the software build fails to start, crashes during operation, or malfunctions, the debug engine 121 can report that the software build is broken. If no malfunction occurs, then the debug engine 121 that the software build is stable. In other examples, the software build is tested by applying any number and combination of suitable tests to the software build.

The last stable software-build can be compared to the problematic code-commit by the debug engine 121 or the patch generation module 126, which may be a self-contained, installable module with computer-executable program code. The comparison is carried out by comparing the source code of the last stable software-build to the problematic code-commit to identify differences between the two. The differences can be code changes that caused the broken software build to break. The identified code change can be used by the patch generation module 126 to develop or suggest a code patch. Suggested patches may include reverting the software build to a prior code-commit or removing the problematic code-commit. Other code changes can be determined based on the nature of the problematic code-commit. A generated patch or suggestion is sent to an administrator or developer for review, editing, and implementation. In some examples, the patch generation module 126 can automatically apply the generated patch to the software project 128A.

Figure 2:
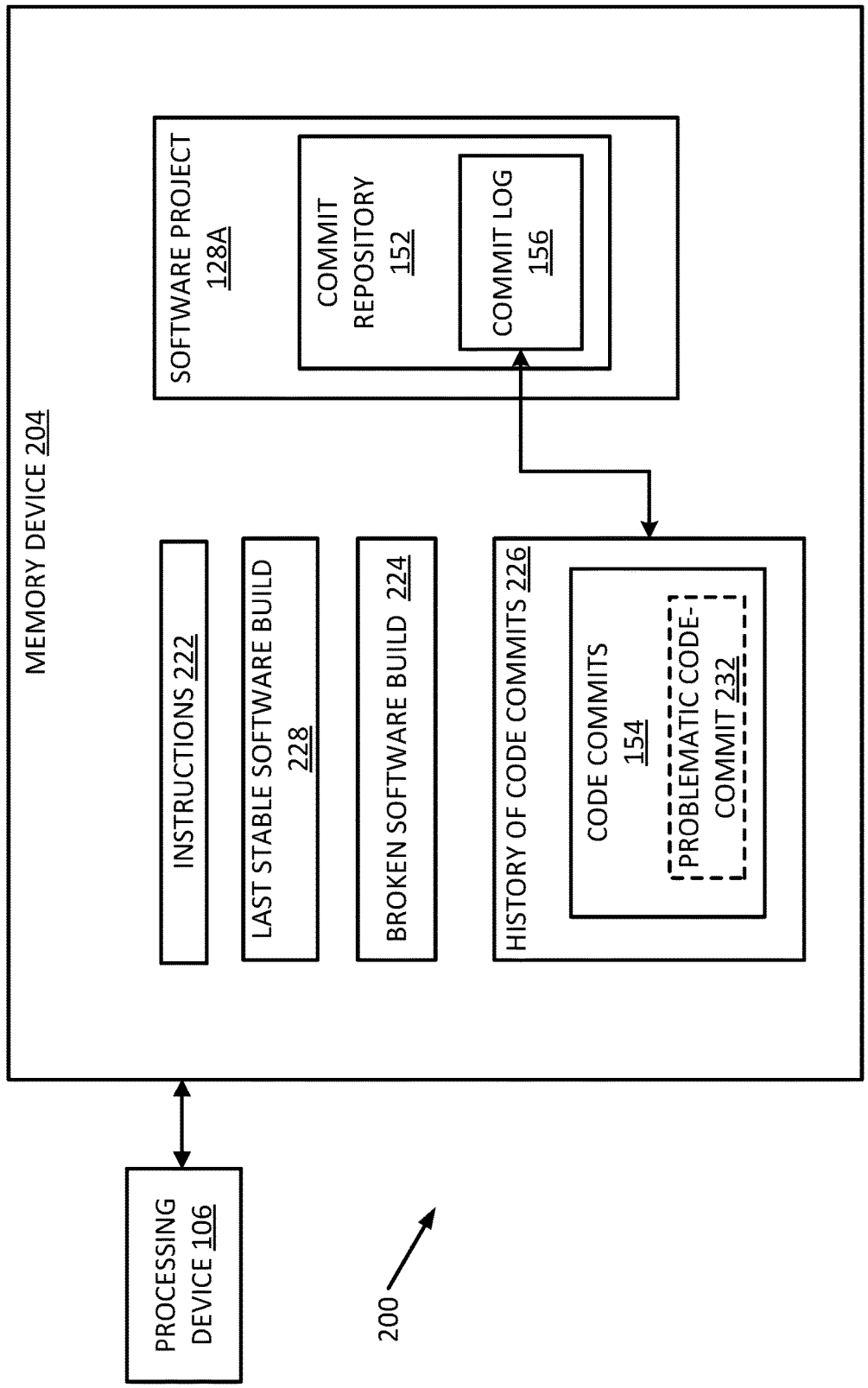
FIG. 2 is a block diagram of an example of a system for identifying problematic code changes and generating software patches according to some aspects.

FIG. 2 is a block diagram of another example of a system 200 for identifying problematic code changes and generating a software patch according to some aspects. The components shown in FIG. 2 are exemplary, and other examples can include more components, fewer components, different components, or a different configuration of the components shown in FIG. 2.

The system 200 includes a processing device 106 communicatively coupled with a memory device 204. In some examples, the processing device 106 and the memory device 204 can be part of a computing device, such as computing devices 104. The processing device 106 can include one processing device or multiple processing devices. Non-limiting examples of the processing device 106 include a Field-Programmable Gate Array (FPGA), an application-specific integrated circuit (ASIC), a microprocessor, etc. The processing device 106 can execute instructions 222 stored in the memory device 204 to perform operations. In some examples, the instructions 222 can include processor-specific instructions generated by a compiler or an interpreter from code written in any suitable computer-programming language, such as C, C++, C #, etc.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a medium from which the processing device 206 can read instructions 222. A computer-readable medium can include electronic, optical, magnetic, or other storage devices capable of providing the processing device 206 with computer-readable instructions 222 or other program code. Non-limiting examples of a computer-readable medium include magnetic disk(s), memory chip(s), ROM, random-access memory (RAM), an ASIC, a configured processing device, optical storage, or any other medium from which a computer processing device can read the instructions 222. The memory device 204 can include the computer-readable medium 120 and the instructions 222 can include software code such as the debug engine 121, patch generation module 126, and software project 128A of FIG. 1.

In some examples, the processing device 106 can identify a broken build of a software program, i.e., the broken software build 224. The processing device 106 can use commit logs 156 from a commit repository 152 associated with the broken software build 224 to generate a history of code commits 226 occurring before the broken software build 224 and after a last stable software-build 228. The processing device 106 can use one of several approaches to test the code commits in the history 226 in order to identify a problematic code-commit 232. Once the processing device 106 identifies the problematic code-commit 232 within the history 226, the processing device 106 can provide an indication of the problematic code-commit 232 to a user. The processing device 106 may also to generate patch code (e.g., using patch generation module 126 of FIG. 1) to mitigate any problems resulting from the problematic code-commit 232. The patch code can be applied to a software project 128A associated with the broken software build 224 to correct the code commit that caused the software build to be unstable.

FIG. 3 is a data table of an example of a list 300 of code commits for use in identifying a problematic code-commit according to some aspects. The list 300 is part of an aggregated history generated from multiple commit logs (e.g., commit logs 156) associated with one or more software projects (e.g., software projects 128A-C). The list 300 is shown in FIG. 3 as a data table, however other data structures such as linked lists, trees, and the like can be used to store information about code commits under analysis.

Each entry in the list 300 can include a number of fields, such as a commit ID for a code commit, a time stamp of implementation, an address or pointer to a location of the code commit (e.g., a network address or location in memory), a priority of the code commit, an indicator of the software build stability of a build made with the code commit, or any combination of these. One or more pointers may be used to maintain the current position within the list 300 and track the broken software build as well as the last stable software-build.

In one example, the list 300 can be traversed using a step-through time technique. For example, if the current commit pointer is not pointing to the oldest code-commit in the list 300, the processing device can locate the commit repository for the current code-commit and build that code commit. The processing device can run one or more of the tests initially failed by the broken software build. If at least one of these tests fails, the processing device can note that the current code-commit is unstable and iterate on to the next-oldest code commit in the list 300. The processing device can repeat this process until it identifies a stable code-commit that passes the tests, at which point the processing device can discern that the next code-commit immediately following the stable code-commit is the problematic code-commit causing the malfunction.

Variations on this technique can include identifying the highest priority software project or code-commit within the aggregated history and beginning the iteration with that code commit. All code commits for that software project can be built and tested before moving on to the second highest priority software project. In another example, the processing device may identify a halfway point within the aggregated history, set the current-commit pointer to the halfway point and begin test the code commit at the halfway point. If the resultant software build is stable, then the processing device can note this within the aggregated history, further divide the portion of the list between the most recent code-commit and the current-commit pointer in half, and then test the code commit at that point (e.g., at the one-quarter point in the aggregated history). Alternatively, if the resultant software build is not stable, then the processing device can note this within the aggregated history, further divide the portion of the list between the current-commit pointer and the end of the list in half, and then test the code commit at that point (e.g., at the three-quarter point in the aggregated history). This iterative division by half and testing can continue until the problematic code-commit is discovered. This process can be significantly faster than sequentially testing the code commits in the list 300.

Figure 4:
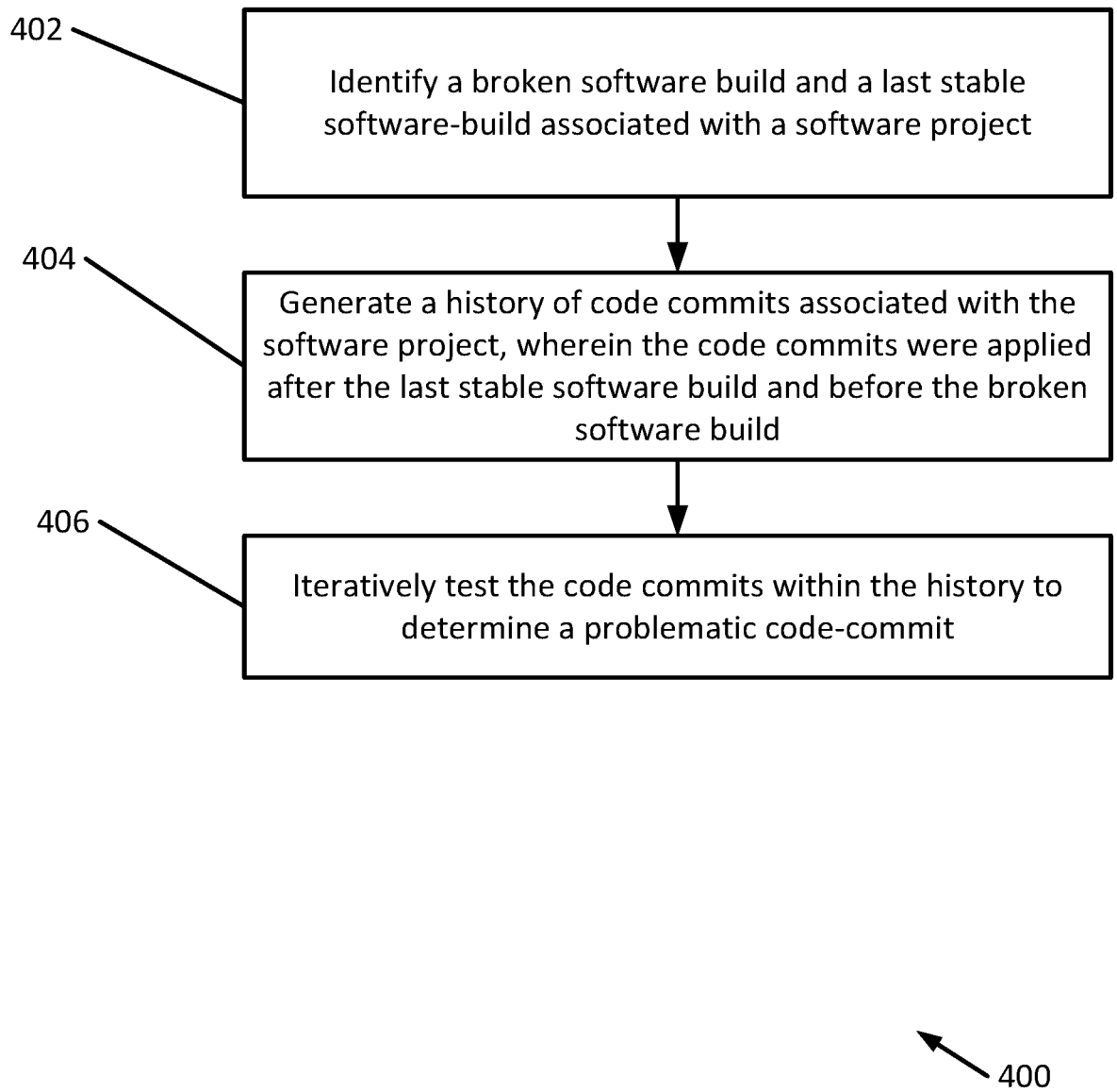
FIG. 4 is a flow diagram of an example of a process for identifying problematic code changes according to some aspects.

FIG. 4 is a flow chart of an example of a process 400 for identifying problematic code changes according to some aspects. Other examples can include more steps, fewer steps, different steps, or a different order of the steps than is shown in FIG. 4. The steps of FIG. 4 are discussed below with reference to the components discussed above in relation to FIG. 2.

In block 402, the processing device 106 can identify a broken software build 224 and the last stable software-build 228 associated with a software project 128A. The broken software build 224 can be one that fails one or more benchmark tests, fails to start, crashes, etc. The last stable software-build 228 can be a build that was previously deemed stable, passed all tests, operates as intended, etc. In some examples, the processing device 106 can identify the broken software build 224 and the last stable software-build 228 based on user input indicating the broken software build 224 and the last stable software-build 228, respectively. Additionally or alternatively, the processing device 106 can test a group of software builds related to the software project 128A in order to identify which software builds broken and which are stable.

In block 404, the processing device 106 can determine a history of code commits 226 associated with the software project 128A, where the code commits 154 in the history 226 were applied after the last stable software-build 228 and before the broken software build 224. For example, the processing device 106 can aggregate code commits 154 from commit logs 156 of commit repositories 152 to generate an aggregated history 226 of some or all of the code commits occurring before the broken software build and after the last stable software-build 228, which may be known to the processing device 106. The history 226 may include commit IDs for each code commit, a timestamp for the implementation of each code commit, a network or memory address of the code commit, an indicator of the status of a software build using the code commit as stable or unstable, or any combination of these.

In block 406, the processing device 106 can iteratively test the code commits 154 within the history 226 to determine a problematic code-commit 232 that is at least partially responsible for the broken software build 224. For example, the processing device 106 can generate a software build using a current code-commit within the history 226. In some aspects, the processing device 106 can iteratively test the stability of software builds using code commits 154 within the history 226. The iterative process can begin with the first code-commit occurring before the timestamp of the broken software build 224. In another aspect, the testing process can begin with a code commit having a highest priority indicator. The code commit associated with the highest priority can be tested first. In another aspect, the history 226 can be iteratively bisected and the current code-commit tested, until the problematic code-commit 232 is found.

In some examples, the processing device 106 can generate a software patch based on a determined code-change between the problematic code-commit 232 and the last stable software-build 228. The software patch can be transmitted over network interface to an administrator in an update approval request. In response to receiving approval from the administrator in the form of a patch approval message, the processing device 106 can implement the software patch as part of the software project.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

The invention claimed is:

1. A system comprising:
a processing device; and
a memory device including instructions executable by the processing device for causing the processing device to:
identify a broken software build and a last stable software-build associated with a software project;
based on identifying the broken software build and the last stable software-build, generate a history of code commits associated with the software project by retrieving a plurality of commit logs from a plurality of commit repositories and aggregating together information from the plurality of commit logs about code commits that were applied to the software project after the last stable software-build and before the broken software build; and
subsequent to generating the history of code commits, iteratively test the code commits specified in the history of code commits to determine a problematic code-commit that is at least partially responsible for the broken software build, wherein iteratively test the code commits specified in the history of code commits to determine the problematic code-commit comprises:
identifying a code commit that is halfway between two boundaries in the history of code commits,
testing the code commit to determine if it is the problematic code-commit, and
if the code commit is not the problematic code-commit, modifying one of the two boundaries to correspond to the code commit.

2. The system of claim 1, wherein the instructions are further executable to cause the processing device to iteratively test the code commits specified in the history of code commits by starting with a most recent code-commit specified in the history of code commits and iteratively testing each previous code-commit specified in the history of code commits until the problematic code-commit is identified.

3. The system of claim 1, wherein the instructions are further executable to cause the processing device to iteratively test the code commits specified in the history of code commits by:
identifying a subset of code commits specified in the history of code commits having that have a high priority; and
testing the subset of code commits with the high priority prior to testing other code commits specified in the history of code commits.

4. The system of claim 1, wherein the instructions are further executable to cause the processing device to iteratively test the code commits specified in the history of code commits by starting with an oldest code-commit specified in the history of code commits and iteratively testing each subsequent code-commit specified in the history of code commits until the problematic code-commit is identified.

5. The system of claim 1, wherein the instructions are further executable to cause the processing device to generate a software patch based on the problematic code-commit.

6. The system of claim 5, wherein the instructions are further executable to cause the processing device to:
transmit an update approval request including the software patch to an administrator computing device for approval; and
apply the software patch to the software project in response to receiving a patch approval message.

7. A method comprising:
identifying, by a processing device, a broken software build and a last stable software-build associated with a software project;
based on identifying the broken software build and the last stable software-build, generating, by the processing device, a history of code commits associated with the software project by retrieving a plurality of commit logs from a plurality of commit repositories and aggregating together information from the plurality of commit logs about code commits that were applied to the software project after the last stable software-build and before the broken software build; and
subsequent to generating the history of code commits, iteratively testing, by the processing device, the code commits specified in the history of code commits to determine a problematic code-commit that is at least partially responsible for the broken software build, wherein iteratively testing the code commits specified in the history of code commits to determine the problematic code-commit comprises:
identifying a code commit that is halfway between two boundaries in the history of code commits,
testing the code commit to determine if it is the problematic code-commit, and
if the code commit is not the problematic code-commit, modifying one of the two boundaries to correspond to the code commit.

8. The method of claim 7, wherein iteratively testing the code commits specified in the history to determine the problematic code-commit comprises testing the code commits specified in the history of code commits by starting with a most recent code-commit specified in the history of code commits and iteratively testing each previous code-commit specified in the history of code commits until the problematic code-commit is identified.

9. The method of claim 7, wherein iteratively testing the code-commits specified in the history to determine the problematic code-commit comprises:
identifying a subset of code commits specified in the history of code commits having that have a high priority; and
testing the subset of code commits with the high priority prior to testing other code commits specified in the history of code commits.

10. The method of claim 7, wherein iteratively testing the code commits specified in the history of code commits to determine the problematic code-commit by starting with an oldest code-commit specified in the history of code commits and iteratively testing each subsequent code-commit specified in the history of code commits until the problematic code-commit is identified.

11. The method of claim 7, further comprising generating a software patch based on the problematic code-commit.

12. The method of claim 11, further comprising:
transmitting an update approval request including the software patch to an administrator computing device for approval; and
applying the software patch to the software project in response to receiving a patch approval message.

13. A non-transitory computer readable medium including instructions that are executable by a processing device for causing the processing device to:
identify a broken software build and a last stable software-build associated with a software project;
based on identifying the broken software build and the last stable software-build, generate a history of code commits associated with the software project by retrieving a plurality of commit logs from a plurality of commit repositories and aggregating together information from the plurality of commit logs about code commits that were applied to the software project after the last stable software-build and before the broken software build; and
subsequent to generating the history of code commits, iteratively test the code commits specified in the history of code commits to determine a problematic code-commit that is at least partially responsible for the broken software build, wherein iteratively test the code commits specified in the history of code commits to determine the problematic code-commit comprises:
identifying a code commit that is halfway between two boundaries in the history of code commits,
testing the code commit to determine if it is the problematic code-commit, and
if the code commit is not the problematic code-commit, modifying one of the two boundaries to correspond to the code commit.

14. The non-transitory computer readable of claim 13, wherein the instructions are further executable to cause the processing device to iteratively test the code commits specified in the history of code commits to determine the problematic code-commit by:
identifying a subset of code commits specified in the history of code commits that have a high priority; and
testing the subset of code commits with the high priority prior to testing other code commits specified in the history of code commits.

15. The non-transitory computer readable of claim 13, wherein the instructions are further executable to cause the processing device to iteratively test the code commits specified in the history of code commits to determine the problematic code-commit by:
starting with an oldest code-commit specified in the history of code commits and iteratively testing each subsequent code-commit specified in the history of code commits until the problematic code-commit is identified.

16. The non-transitory computer readable of claim 13, wherein the instructions are further executable to cause the processing device to:
generate a software patch based on the problematic code-commit.

17. The system of claim 1, wherein the history of code commits consists only of the information about the code commits that were applied to the software project after the last stable software-build and before the broken software build.

* * * * *